United States Patent [19]

Johnson

[11] Patent Number: 4,931,316

[45] Date of Patent: Jun. 5, 1990

[54] PREPARATION OF INTERSTITIAL TITANIUM CERAMIC FIBERS

[75] Inventor: Robert E. Johnson, Hoboken, N.J.

[73] Assignee: Hoechst Celanese Corp., Somerville, N.J.

[21] Appl. No.: 240,645

[22] Filed: Sep. 6, 1988

[51] Int. Cl.[5] .................. D06M 13/50; D01F 9/22
[52] U.S. Cl. .................... 427/227; 427/229; 427/337; 427/377; 427/380; 427/381; 427/434.6; 264/29.1; 264/29.2; 264/83; 264/129; 264/211
[58] Field of Search ............. 8/115.68, 115.69; 427/335, 337, 343, 371, 227, 229, 377, 380, 381, 434.6; 264/29.1, 29.2, 82, 83, 129, 131, 60, 48, 211; 423/609; 501/38, 95, 134

[56] References Cited

U.S. PATENT DOCUMENTS

| 2,668,284 | 2/1954 | Dills ................................. 427/343 |
| 3,399,979 | 9/1968 | Hamling ............................ 23/347 |
| 3,403,008 | 9/1968 | Hamling ............................ 23/344 |
| 3,846,527 | 11/1974 | Winter et al. .................... 264/63 |
| 4,010,233 | 3/1977 | Winter et al. .................... 264/63 |
| 4,126,652 | 11/1978 | Oohara et al. ................... 264/29.6 |
| 4,559,191 | 12/1985 | Arons ............................... 264/60 |
| 4,732,750 | 3/1988 | Olson et al. ...................... 423/609 |

*Primary Examiner*—Hubert C. Lorin
*Attorney, Agent, or Firm*—Depaoli & O'Brien

[57] ABSTRACT

Titanium-containing preceramic fibers are provided with a high loading of titanium by impregnating a polymeric fiber with a liquid comprising a titanium alkoxide where the alkoxide contains at least 2 carbon atoms and precipitating the titanium alkoxide in the fiber as titanium dioxide. Useful titanium alkoxides include titanium tetraethoxide, titanium tetrabutoxide and titanium isopropoxide.

20 Claims, No Drawings

PREPARATION OF INTERSTITIAL TITANIUM CERAMIC FIBERS

FIELD OF THE INVENTION

The present invention is directed to a process for preparing titanium-containing ceramic articles and, in particular, to a process for producing titanium-containing ceramic fibers

BACKGROUND OF THE INVENTION

Ceramic materials are of critical importance for a number of high temperature, high performance applications such as gas turbines. These applications require a unique combination of properties such as high specific strength, high temperature mechanical property retention, low thermal and electrical conductivity, hardness and wear resistance, and chemical inertness. Design reliability and the need for economical fabrication of complex shapes, however, have prevented ceramic materials from fulfilling their potential in these critical high temperature, high performance applications.

The design reliability problems with ceramics, and the resultant failure under stress, are due largely to the relatively brittle nature of ceramics. This, in combination with the high cost of fabricating complex shapes, has limited the usage of ceramics.

To overcome the problems associated with molding ceramic compositions into products, various alternatives have been suggested. For example, it is believed that the process of manufacturing ceramic articles from metal-containing polymers has the potential to overcome the problems associated with molding and sintering inorganic ceramic compositions. Thus, polymers based on silicon, carbon and/or nitrogen and oxygen have been developed. See for example, "Siloxanes, Silanes and Silazanes in the Preparation of Ceramics and Glasses" by Wills et al, and "Special Heat-Resisting Materials from Organometallic Polymers" by Yajima, in Ceramic Bulletin, Vol 62, No. 8, pages 893-915 (1983), and the references cited therein. Typically, the organosilicon preceramic polymers are pyrolyzed in an inert gas to form silicon carbide and/or silicon nitride-containing articles, especially fibers. It is believed that the formation of silicon carbide fibers is the only commercial product formed by this technology. Accordingly, there is a need to develop ceramic articles from other metal-containing polymers, especially ones that exhibit superior resistance to high temperature oxidation.

Another process for producing ceramic articles, including fibers, is disclosed in U.S. Pat. Nos. 3,399,979 and 3,403,008. According to these patents, a preformed organic polymeric material is impregnated with a solution of a metal compound, the impregnated material heated to leave a carbonaceous relic containing the metal in finely dispersed form and further heated at 1,000°-2,000° C. in a nonoxidizing atmosphere to form the metal carbide or metal nitride depending on the atmosphere utilized. A similar approach has been taken in the formation of metal oxide fibers. Thus, as disclosed in U.S. Pat. Nos. 3,846,527 and 4,010,233 metal salts are incorporated into polymeric spinning solutions, the solutions spun into fibers, and the fibers calcined in air to yield metal oxide fibers. Use of alternative calcination atmospheres leads to the formation of metal carbide or nitride fibers. Use of metal salt mixtures are disclosed as resulting in bimetallic oxide fibers.

Still another approach has been to disperse ceramic powders in a carrier component such as organic liquids including low molecular weight polymers, spin the dispersion into fibers and then sinter the ceramics. An example of this procedure for producing ceramic fibers such as ferrimagnetic spinel fibers is disclosed in U.S. Pat. No. 4,559,191.

U.S. Pat. No. 4,126,652 discloses a process for preparing metal carbide-containing molded products which comprises heating a molded composition comprising at least one powdery metal selected from the group consisting of B, Ti, Si, Zr, Hf, V, Nb, Ta, Mo, W, Cr, Fe, and U and having an average particle size of not more than 50 microns and an acrylonitrile polymer at a temperature of about 200°-400° C., and then calcining the resulting product at a temperature of about 900°-2,500° C. in an inert atmosphere to form the metal carbide. Metal carbide fibers can be formed by the process which involves spinning the mixture of metal and carbon-forming polymer into fiber, heating to render the fibers infusible and then pyrolyzing to yield the metal carbide. The metals may be added together with any conventional calcining aid including metal oxides. One example in the patent describes adding metallic tungsten and metallic silicon to a polyacrylonitrile solution and ultimately forming fiber consisting of tungsten carbide and silicon carbide.

Of the ceramic fibers which have been produced by the above-mentioned processes, it appears that silicon carbide fiber formed from preceramic polymers is the only ceramic fiber to gain market acceptance. However, the metal-containing polymers are typically of low molecular weight and it has been found difficult to maintain a threadline during spinning such ceramic precursors into fiber. It has also been found that trying to spin a polymeric dope containing ceramic particles is quite difficult, in particular, due to the necessity of loading the polymers with high levels of inorganic substances, which high loadings vastly increase the viscosity of the spinning dopes. On the other hand, impregnating polymeric fibers and the like with aqueous solutions of metal salts has been unsatisfactory in view of the small loadings of metals which are obtained in the fiber. The impregnation method, however, has an advantage over forming ceramic fibers from spinning dopes which contain ceramic or metallic particles, since in the impregnation method, the fiber is spun from known fiber-forming organic materials and, thus, there are no spinning and handling problems with regard to the preceramic fiber. However, to make the impregnation method for forming ceramic fibers practical, methods of obtaining higher loadings of the metal into the polymeric substrate must be found.

It is thus one of the objects of the present invention to provide a novel process for producing titanium-containing ceramic articles.

Another and important object of the present invention is to provide an improved process for producing titanium ceramic fibers which contain an increased titanium content.

These and other objects, aspects and advantages, as well as the scope, nature and utility of the present invention, will be apparent from the following description and appended claims.

SUMMARY OF THE INVENTION

In accordance with the present invention, titanium-containing ceramic fibers are produced by passing a spun organic fiber through a liquid bath containing a titanium alkoxide to impregnate the fiber with the titanium compound and, subsequent to impregnation, contacting the impregnated fiber with a bath of ammonium hydroxide to precipitate titanium dioxide in the fiber. It has been found that the loading level of titanium dioxide in the green fiber can reach as high as about 30 wt. %, which represents about a threefold improvement over $TiO_2$ loading using previous metal loading techniques such as the use of a solution of metal halide as the imbibation agent. The titanium alkoxides utilized in this invention are liquids at room temperature and, thus, a bath of the neat reagent can be used. Previous technologies in which a solvent was needed to dissolve the metal salt placed substantial limits on the loading level of the metal as the solubility of the metal salts was an important limiting factor. Heating the titanium dioxide-loaded fiber in a nonoxidizing atmosphere results in the formation of an interstitial titanium ceramic fiber.

DETAILED DESCRIPTION OF THE INVENTION

The useful polymers in accordance with the present invention are those which can be spun into fiber or otherwise molded into articles. Thus, useful polymers can comprise natural pitches or the like or synthetic polymers which can be carbonized to yield a carbon article or burned off completely.

A particularly preferred polymer is polyacrylonitrile and copolymers thereof which are used in the formation of carbon fibers. As the acrylonitrile polymer to be used in the invention, those disclosed in the aforementioned U.S. Pat. No. 4,126,652 are useful. Thus, polymers containing not less than about 80% by weight of units of acrylonitrile are favorable. When the acrylonitrile polymer is a copolymer, the other monomeric units may be derived from any monomer copolymerizable with acrylonitrile of which preferred examples are acrylic acid and esters thereof such as methyl acrylate, ethyl acrylate, 2-chloroethyl acrylate, 2-hydroxy-3-chloropropyl acrylate, 2,3-dibromopropyl acrylate, tribromophenyl acrylate, 2-hydroxyethyl acrylate, 2-methoxyethyl acrylate, methoxypolyoxyethylene acrylate and N,N-dimethylaminoethyl acrylate, methacrylic acid and esters thereof corresponding to the above mentioned acrylic acid esters, derivatives of acrylic acid esters such as methyl 2-hydroxymethylacrylate and methyl 2-hydroxymethylmethacrylate, itaconic acid and ester derivatives thereof, allylamine and derivatives, diallylamine and derivatives, phosphorus-containing monomers such as dimethyl 2-cyano-1-methylallylphosphonate, dimethyl 2-cyano-allylphosphonate and dimethyl 2-ethoxycarbonyl allylphosphonate, styrene and derivatives such as sodium p-styrenesulfonate, chloromethylstyrene and 1-methylstyrene, vinyl acetate, acrylamide, dimethylacrylamide, diacetacrylamide, methyl vinyl ketone, methyl isopropenyl ketone, methacrylonitrile, vinylidene cyanide, 1-cyanovinyl acetate, 2-hydroxymethylacrylonitrile, 2-acetylaminomethylacrylonitrile, 2-methoxymethylacrylonitrile, 2-(1-hydroxyethyl)acrylonitrile, 2-ethoxymethylacrylonitrile vinylidene chloride, vinyl bromide, sodium allylsulfonate, sodium methallylsulfonate, allyl alcohol, methallyl alcohol, etc.

The molecular weight of the acrylonitrile polymer is usually in a range of about 30,000 to 300,000. More particularly, it may be preferably chosen in such a manner that the viscosity at the molding step becomes from about 50 to 10,000 poise.

Other suitable polymers include polyisobutylene, polyisoprene, polystyrene, polymethyl methacrylate, polyvinyl alcohol, polyacrylamide, polyacrylic acid, polyethylene oxide, cellulose, carboxymethyl cellulose, hydrolyzed starch, dextran, guar gum, polyvinylpyrrolidone, polyurethane, polyvinyl acetate, and the like, and mixtures thereof.

The source of titanium to be used in impregnating the spun organic fiber or molded article comprises titanium alkoxides in which the alkoxy group is formed from an alkyl radical containing at least two carbon atoms. Preferably, the titanium alkoxide is formed from an alkyl radical comprising between two to four carbon atoms, e.g., titanium tetraethoxide, titanium tetrapropoxide, and titanium tetrabutoxide. Most preferably, the titanium source is titanium tetraisopropoxide.

The titanium tetraalkoxides useful in this invention are advantageous inasmuch as the preferred compounds are generally liquids and, thus, can be used as neat imbibation agents or with little solvent for impregnating the titanium into the organic fiber. In view of the low solvent dilution required to provide the titanium source in liquid form, a greater quantity of titanium can be incorporated into the fibers as the organic fiber is passed through the bath of the titanium alkoxide liquid or solution.

In the imbibation process, the dip solution concentration and viscosity are among the most important parameters which must be considered in determining how much titanium will be incorporated in the fiber. The viscosity relative to titanium ethoxide and butoxide is quite high and may interfere with the impregnation process and ultimate loading of the fiber with titanium. Neat titanium ethoxide has a viscosity of 125 centipoise measured on a Brookfield viscometer, and a neat titanium butoxide has a viscosity of 163 centipoise, Brookfield viscometer. Thus, solvent dilution may be useful when these alkoxides are used as the titanium imbibation agents. It should be understood, however, that lowering the concentration of the titanium compound reduces the amount of titanium available for impregnation while, on the other hand, a high viscosity interferes with the impregnation process and, ultimately, the loading of the titanium in the fiber. Thus, a balance between concentration and viscosity will have to be maintained to achieve the highest Ti loading. Solvent additions of up to 20 wt %, or from 4-20 wt. % based on total liquid are useful. Preferred solvent additions range from between about 5 to 10 wt. %.

The most preferred imbibation agent is titanium tetraisopropoxide. Titanium tetraisopropoxide is a liquid and is considerably less viscous than the ethoxide or butoxide having a viscosity of 11.0 centipoise, Brookfield viscometer. It is, thus, possible and preferable to use neat titanium tetraisopropoxide as the imbibation agent.

If a solvent is to be utilized to reduce the viscosity of the neat titanium alkoxides, the solvent used is preferably the alcohol which corresponds to the alkoxide. Thus, ethanol and butanol are utilized to reduce the viscosity of the titanium ethoxide and titanium butoxide, respectively.

The process of this invention involves spinning the organic fiber by conventional techniques, such as dry or wet spinning. Upon formation of the fiber, the fiber is dipped into a bath of the titanium alkoxide. After emerging from the bath of titanium alkoxide, the fiber is infiltrated with the titanium compound. The impregnated fiber is then carried to a bath of ammonia solution which fixes the titanium compound as titanium dioxide which is precipitated as minute particles within the fiber.

The preceramic polymeric fiber can be converted to any one of a variety of fibrous configurations prior to undergoing thermal treatment. For example, the fiber can be in the form of filaments, staple fibers, tows, plied yarns, knits, braids, fabrics, or other fibrous assemblages while undergoing thermal treatment. Alternatively various fibrous configurations may be formed form the inorganic fibers at the conclusion of the pyrolysis step of the process.

To provide a final ceramic fiber product with optimal physical properties, it is preferred to subject the preceramic polymeric fiber to an initial thermal treatment in a molecular oxygen environment. The organic polymer substrate in the preceramic fiber is partially carbonized to a stabilized form so that the subsequent pyrolysis step of the process can be effected without the concomitant destruction of the fibrous configuration. The thermal treatment step can be conducted by heating the fiber in a molecular oxygen-containing atmosphere at a temperature ranging between about 200°–600° C. The thermal treatment temperature selected is dependent upon the polymer resistance to distortion at elevated temperatures, and should not exceed the polymer melting point during at least the initial phase of the thermal treatment.

Volatile components that evolve during the thermal treatment step include water vapor and oxygen, and carbon monoxide and carbon dioxide resulting from a partial combustion of the polymer. Typically a 15–50% reduction in the weight of the fiber occurs during the thermal treatment step. It is believed that a crosslinking of carbon atoms occurs during the thermal treatment to produce a charred structure which is capable of serving as a carrier for the inorganic content of the fiber.

The thermal treatment can be performed in an auto clave by heating to the required temperature/time schedule. A continuous thermal treatment can be accomplished by the continuous passage of a fiber through a heated chamber or calcining furnace. The fibrous structure of the fiber is retained throughout the thermal treatment step. There is a tendency for the fiber to shrink while undergoing thermal treatment.

Alternatively, the preceramic fibers can be subjected to a chemical stabilization treatment before being subjected to the pyrolysis step. In a typical stabilization procedure, the dried fibers are contacted with a reactive free radical-forming agent such as diazidoformamide, which effects the desired crosslinked structure in the fiber substrate at ambient temperatures (e.g., 10°–40° C.).

In the subsequent pyrolysis step of the process, the preceramic fiber (either charred or uncharred) is subjected to a temperature between about 700°–2,500° C. (preferably about 1,100°–1,800° C.). The pyrolysis period normally will range between about 0.2–8 hours. Any pyrolysis gas can be utilized to pyrolyze the fibers. Thus, inert gases will lead to the formation of metal carbides while reactive nitrogen-, phosphorus-, and metalloid-containing gases will lead to other ceramic materials being formed. Thus, if a carbide is desired, the pyrolyzation gas will be inert and the precarbonaceous polymer will be one that does not easily burn away so as to form a carbon structure which can be used for reaction. On the other hand, if the ceramic is to be formed from reaction of titanium and the pyrolyzing atmosphere, it may be desirable to use as the precarbonaceous polymer a polymer which burns off relatively easy.

It is also possible to add other metals to the ceramic fibers of the present invention to yield a fiber containing at least two ceramic materials therein. This can be accomplished by adding fine metal or metallic particles to the spinning dope comprising the organic polymer. For best results, the size of the metal particles should be on the order of one micron or less. Upon spinning the polymeric dope containing the metal particles, the fiber is treated in the manner as described above, wherein the spun fiber is passed through the bath containing the titanium alkoxide, the precipitating agent, and finally to stabilization and pyrolysis to form a ceramic fiber containing titanium metal and the added metal component. Preferred metals for adding to the spinning dope include elemental boron or silicon. Loadings as high as 50 to 70 wt. % based on the spinning dope are possible with fine particle sizes.

The following examples are for the purposes of illustrating the invention only and should not be construed so as to limit the invention solely to the embodiments shown.

EXAMPLES

Various titanium compounds were tested as imbibation agents for impregnating polyacrylonitrile (PAN) fibers. A comparison of titanium loadings found in the preceramic fibers relative to the agents tested, and at several concentrations is shown in Table I.

The dip bath process of loading the fiber consisted of wet spinning a dope of PAN homopolymer, (Bayer) in dimethylacetamide (DMAC) using a standard configuration into a coagulation bath made up of 70/30 methanol/DMAC. As this fiber emerged from the coagulation bath it was still swollen and susceptible to infiltration by the dip solution. It was fed on-line into the dip bath and then carried into a bath of ammonia solution (50/50 vol %). This bath fixed the Ti species as $TiO_2$ and further coagulated and washed the fiber.

EXAMPLE 1

Titanium(IV)chloride/Methanol

Neat titanium tetrachloride is a corrosive, reactive liquid (25.3 wt. % Ti). Using it as a dip bath was complicated by the extensive redesign necessary for precautions. The compound also combines with DMAC and this product builds up in the dip tube. The swollen PAN fibers are reactive with $TiCl_4$ and no acceptable spinning sample was collected with this dip.

Combining $TiCl_4$ with methanol results in a variety of products depending on the stoichiometry of the addition. However the primary species is $TiCl_2(OCH_3)_2$. The solubility of $TiCl_2(OCH_3)_2$ in methanol is quite high but the viscosity of the solution becomes severe after approximately 40 wt. % $TiCl_4$ in methanol and precipitates when addition of $TiCl_4$ exceeds 50 wt. % in methanol.

400 g (505 ml) of dry methanol (Aldrich) was placed in an iced beaker fitted with a dropping funnel and stirring bar. The methanol was cooled to approximately 5° C. To the stirred, iced solvent was slowly added 261 g (151 ml) of freshly opened TiCl$_4$ (Aldrich) by means of the dropping funnel. The reaction was vigorous and splattering occurred; but, as the addition was slow and a watch glass was placed over the majority of the beaker opening, the procedure presented no hazards. Heat was given off during the addition and hydrogen chloride was evolved. As the addition proceeded, the splattering diminished and the solution viscosity increased. After all the TiCl$_4$ had been added, the solution was reweighed and methanol added to make up for the lost weight. In this way, the final solution could be said to contain 10 wt. % Ti and an undetermined amount (less than or equal to 29.5 wt. %) of chloride. The product was lemon yellow and no further analysis or characterization was carried out. The concentration of titanium in the above solution reached a practical peak at approximately 10 wt. %. Other concentrations were tested. The titanium content in the spun fiber never increased beyond 8 wt. %.

EXAMPLE II

Titanium Ethoxide and Titanium Butoxide

To increase the fiber titanium content, other systems were investigated. Titanium(IV)tetraethoxide (21.0 wt. % Ti, Aldrich) is sold with added ethanol as a 20 wt. % Ti viscous liquid. Titanium(IV)alkoxides with radicals larger than ethyl are generally liquids, but they are viscous as in the case of the butoxide (14.1 wt. % Ti, Aldrich). Nevertheless, both the ethoxide and butoxide were used as dip baths since their titanium contents are considerably greater than that for the TiCl$_4$ solutions. Experiments for both mimicked one another; therefore, those for only the ethoxide are outlined here.

In a typical run the neat ethoxide was poured into a graduated cylinder and placed in the spinning line directly after the coagulation bath. Several coagulation bath compositions were tried by varying the amount of methanol to DMAC, but a 70/30 mixture was found to be adequate. As the imbibed fiber emerged from the dip bath it was heavily coated with the titanium alkoxide, and addition of fresh reagent was necessary throughout the run. This viscous coating rubbed off on the fiber guide and precipitated TiO$_2$ from reaction with atmospheric moisture. This buildup was a serious interference and had to be monitored and removed throughout the run. Reaction of the loaded, coated fiber with the fixing bath of 50/50 ammonium hydroxide solution was immediate and the fiber was encrusted with a thick layer of TiO$_2$ which was removed. Although the obvious coating of TiO$_2$ was removed, the fiber was a dull white and somewhat stiff, unlike unloaded PAN.

The immersion time in the dip was another critical process parameter. The loading is roughly directly proportional to the time or, in the present configuration, to the solution level in the graduated cylinder used as the dip bath. A limit is reached for each system, which for this case was 28 cm. Immersion times need to be empirically determined for each specific case as varying fiber diameter, filaments per bundle, solution characteristics, and degree of as-spun fiber swelling all influence the dynamics of the imbibation.

The viscosity of the neat alkoxides was high and interfered with the infiltration process and ultimate loading. Therefore, experiments with diluted ethoxide solutions were investigated. As was the case for the TiCl$_4$/methanol solutions, some dilution did improve the titanium pick-up, but was ultimately counteracted by the lower imbibation potential of less concentrated solutions (see Table 1).

EXAMPLE III

Titanium Isopropoxide

Titanium(IV)tetraisopropoxide is also a liquid (16.85 wt. % Ti, Aldrich) but is considerably less viscous than the ethoxide or butoxide. A dip bath consisting of the neat liquid was much easier to work with as the impairing TiO$_2$ buildup on fiber guides was more manageable. The reaction between the isopropoxide and the ammonium hydroxide fixing wash was immediate. In general, the isopropoxide was a better imbibing reagent and it was used to obtain the fibers with the highest TiO$_2$ loading.

TABLE 1

| Titanium Solution | | Wt. % Ti in Green Fiber* |
|---|---|---|
| TiCl$_4$/MeOH | | |
| 6.3 wt. % Ti | (25.0 wt. % MeOH) | 8.12% |
| 7.6 wt. % Ti | (30.1 wt. % MeOH) | 6.66% |
| 10.0 wt. % Ti | (60.4 wt. % MeOH) | 6.80% |
| Ti(OEt)$_4$/EtOH | | |
| 8.4 wt. % Ti | (60.0 wt. % EtOH) | 6.0% |
| 16.85 wt. % Ti | (19.7 wt. % EtOH) | 16.0% |
| 20.00 wt. % Ti | (4.7 wt. % EtOH) | 14.4% |
| Ti(OPr$^i$)$_4$ (neat) | | |
| 16.85 wt. % Ti | | 17.75% |
| Ti(OBu$^n$)$_4$/Bu$^n$OH | | |
| 7.04 wt. % Ti | (50.0 wt. % BuOH) | 5.3% |
| 14.07 wt. % Ti | (<1 wt. % BuOH) (neat) | 15.0% |

*Determined by gravimetric ashing of green fiber.

What is claimed is:

1. A process for preparing titanium-containing preceramic fibers comprising: impregnating a carbon-forming polymeric fiber with a liquid titanium composition comprising up to 20 wt. % of a solvent and a titanium tetraalkoxide wherein each alkoxy group contains 2 to 4 carbon atoms and, precipitating the titanium compound in the fiber as titanium dioxide.

2. The process of claim 1 wherein said titanium composition comprises titanium tetraethoxide or titanium tetrabutoxide.

3. The process of claim 2 wherein said titanium composition includes said solvent.

4. The process of claim 1 wherein said carbon-forming polymer comprises polyacrylonitrile.

5. The process or claim 1 wherein said titanium composition comprises titanium tetraisopropoxide.

6. The process of claim 5 wherein said liquid titanium composition consists of said tetraisopropoxide.

7. The process of claim 5 wherein said carbon-forming polymer is polyacrylonitrile.

8. The process of claim 1 wherein said titanium dioxide is precipitated in said fiber by contacting the impregnated fiber with an ammonia solution.

9. A process for preparing titanium-containing preceramic articles comprising: impregnating a shaped carbon-forming polymer with a liquid titanium composition comprising up to 20 wt % of a solvent and a titanium tetraalkoxide wherein each alkoxy group contains 2 to 4 carbon atoms and, precipitating the titanium compound in the article as titanium dioxide.

10. The process of claim 9 wherein said titanium composition comprises titanium tetraethoxide or titanium tetrabutoxide.

11. The process of claim 10 wherein said titanium composition includes said solvent.

12. The process of claim 9 wherein said titanium composition comprises titanium tetraisopropoxide.

13. The process of claim 12 wherein said liquid titanium composition consists of said titanium tetraisopropoxide.

14. The process of claim 9 wherein said titanium dioxide is precipitated in said article by contacting the article impregnated with an ammonia solution.

15. A process for preparing titanium-containing ceramic fibers comprising: impregnating a carbon-forming polymeric fiber with a liquid titanium composition comprising a titanium tetraalkoxide wherein each alkoxy group contains 2 to 4 carbon atoms, precipitating the titanium compound in the fiber as titanium dioxide, curing the impregnated fiber subsequent to said precipitation and pyrolyzing said cured fiber to form a fiber which contains a titanium-containing ceramic.

16. The process of claim 15 wherein said carbon-forming polymer is spun from a solution containing a polymer and metal or metallic particles whereby subsequent to pyrolyzation said fiber contains a ceramic containing titanium and said metal.

17. The process of claim 15 wherein said liquid titanium composition comprises up to 20 wt. % of a solvent.

18. The process of claim 17 wherein said liquid titanium composition includes said solvent.

19. The process of claim 15 wherein said titanium tetraalkoxide is titanium tetraisopropoxide.

20. The process of claim 15 wherein said liquid titanium composition consists of titanium tetraisopropoxide.

* * * * *